United States Patent
Abe

(10) Patent No.: US 10,678,430 B2
(45) Date of Patent: Jun. 9, 2020

(54) TERMINAL DEVICE AND PROGRAM

(71) Applicant: MITUTOYO CORPORATION, Kanagawa (JP)

(72) Inventor: Shinsaku Abe, Hokkaido (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/019,737

(22) Filed: Jun. 27, 2018

(65) Prior Publication Data
US 2019/0004697 A1 Jan. 3, 2019

(30) Foreign Application Priority Data
Jul. 3, 2017 (JP) ................... 2017-130133

(51) Int. Cl.
*G06F 3/0488* (2013.01)
*G06F 3/041* (2006.01)
*G06F 3/0484* (2013.01)
*G01B 11/00* (2006.01)

(52) U.S. Cl.
CPC ........ *G06F 3/04886* (2013.01); *G06F 3/0412* (2013.01); *G06F 3/0488* (2013.01); *G06F 3/04845* (2013.01); *G01B 11/002* (2013.01); *G06F 3/0416* (2013.01); *G06F 2200/1637* (2013.01); *G06F 2203/04806* (2013.01)

(58) Field of Classification Search
CPC ... G06F 3/04886; G06F 3/0412; G06F 3/0416
See application file for complete search history.

(56) References Cited

U.S. PATENT DOCUMENTS

| | | | | |
|---|---|---|---|---|
| 8,947,355 B1* | 2/2015 | Karakotsios | ............ | G06F 3/017 345/158 |
| 2010/0013761 A1* | 1/2010 | Birnbaum | ......... | H04M 1/72544 345/156 |
| 2011/0234639 A1* | 9/2011 | Shimotani | .......... | G01C 21/3664 345/661 |
| 2014/0331129 A1* | 11/2014 | Saeki | ....................... | G06F 3/016 715/702 |
| 2016/0274773 A1* | 9/2016 | Koga | .................. | G06F 3/04817 |
| 2016/0357432 A1* | 12/2016 | Aghaei | ..................... | G06F 8/31 |

FOREIGN PATENT DOCUMENTS

JP      2016-173703 A      9/2016

* cited by examiner

*Primary Examiner* — Amare Mengistu
*Assistant Examiner* — Jennifer L Zubajlo
(74) *Attorney, Agent, or Firm* — Greenblum & Bernstein, P.L.C.

(57) ABSTRACT

A terminal device includes a controller, a display displaying an image based on a control by the controller, and a sensor detecting oscillation. The controller displays, in response to a predetermined oscillation detected by the sensor, enlarged display content which is a portion of an image displayed on the display, the enlarged display content being enlarged and displayed in an enlarged display region. The sensor may be able to detect oscillation and posture, and the controller may obtain from the sensor the posture at the time when the sensor detected the oscillation and determine a position of the enlarged display region in the display according to the obtained posture.

23 Claims, 7 Drawing Sheets

TERMINAL DEVICE AND PROGRAM

CROSS-REFERENCE TO RELATED APPLICATIONS

The present application claims priority under 35 U.S.C. § 119 of Japanese Application No. 2017-130133, filed on Jul. 3, 2017, the disclosure of which is expressly incorporated by reference herein in its entirety.

BACKGROUND OF THE INVENTION

1. Field of the Invention

The present invention relates to a terminal device and a program which achieves an operation interface suitable for a touch input.

2. Description of Related Art

Conventionally, various measuring apparatuses measuring a measured object have been achieved. It is common for the measuring apparatus to be configured with a main body and a control device being separate. In this regard, recently, a so-called tablet computer provided with a touch screen panel display as an input and display mechanism offers a high performance and is widely spread, and accordingly a measuring apparatus provided with a tablet computer as a control device for the measuring apparatus (or as an input interface for the control device) is likely be proposed (see, for example, Japanese Patent Laid-open Publication No. 2016-173703 A).

A so-called touch interface, that operates by touching a touch screen panel display where menus and icons are displayed, allows an intuitive operation, but it is difficult to accurately specify a position intended by a user when a fine position inside a display screen is being specified. In other words, in the conventional input mechanism such as a mouse, when the position inside the display screen is specified, a cursor displayed in a screen is moved using a mouse and the like, and the position can be specified by positioning the cursor accurately at the intended position. On the other hand, in the touch interface, a gravity center of a region brought into contact with the display screen by a finger or a pen point is normally treated as the specified position. The gravity center of the contact region is hidden from the user's view behind the finger or the pen point. Therefore, the user cannot find an exact position specified by the user and it is not easy to specify the user's intended position accurately.

In particular, when software that is designed assuming operation by the conventional input mechanism such as the mouse is operated on the touch interface, a display size of menu items and tool bar buttons may not be large enough for accuracy in specifying a contact position through the touch interface, and therefore, performing accurate operation is not easy. On the other hand, modifying the conventionally used software for use with the touch interface is not easy considering cost and labor.

SUMMARY OF THE INVENTION

The present invention was conceived in light of the circumstances above, and provides a terminal device and a program to allow specifying an accurate position by a touch input.

In order to address the above circumstances, a terminal device according to the present invention includes a controller, a display displaying an image based on a control by the controller, and a sensor detecting oscillation. The controller displays, in response to a predetermined oscillation detected by the sensor, enlarged display content which is a portion of an image displayed on the display, the enlarged display content being enlarged and displayed in an enlarged display region.

In the present invention, the sensor may be able to detect oscillation and posture, and the controller may obtain from the sensor the posture at the time when the sensor detected the oscillation and determine the position of the enlarged display region in the display according to the obtained posture.

In the present invention, the controller may determine magnification power to enlarge the enlarged display content according to a size and/or repetition of the oscillation detected by the sensor.

The present invention further includes a touch screen panel, which is superimposed on the display, detecting an input operation due to a contact. When the touch screen panel detects a sliding operation (slide operation) being performed with respect to the position corresponding to the enlarged display region, the controller may change the enlarged display content according to a direction and/or size of the sliding operation. In addition, when the touch screen panel detects the input operation being performed with respect to the position corresponding to the enlarged display region, based on the enlarged display content displayed in the enlarged display region when the input operation is performed, the controller may convert the contact position in the enlarged display region to a position in an original image and receive the input operation as a contact operation with respect to the converted original image position.

In the present invention, the controller, in a state where the enlarged display region is displayed, may end displaying the enlarged display region as well as display the original image on the display when the touch screen panel detects the input operation with respect to a region outside of the enlarged display region.

A program according to the present invention causes a computer to function as any one of the above-mentioned terminal devices.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
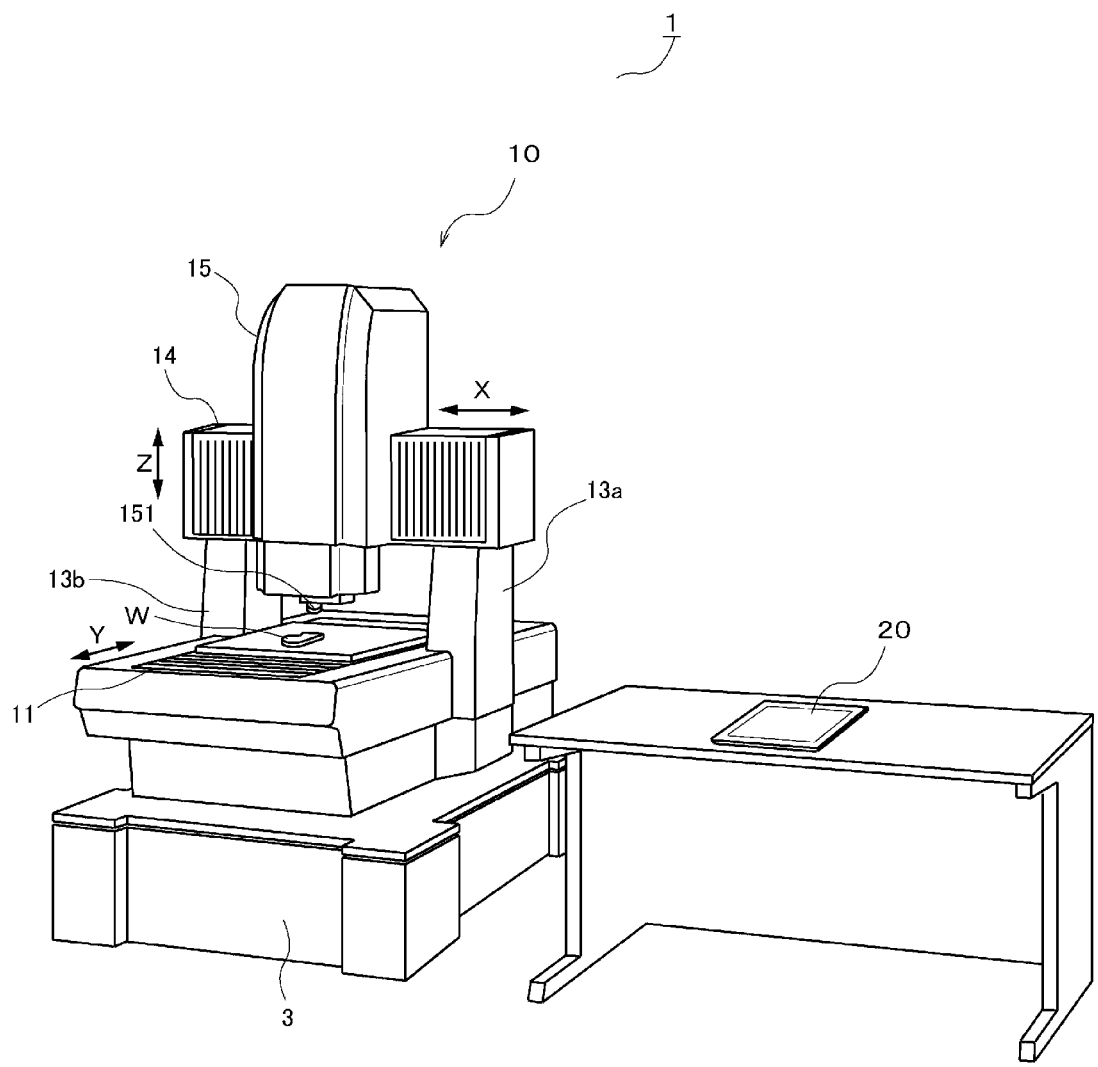
FIG. 1 is a perspective view illustrating a configuration of an image measuring apparatus as an example of a measuring apparatus.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings. In the following description, portions identical to those which have been previously described are assigned identical reference numerals and a description thereof is omitted where appropriate.

Configuration of Measuring Apparatus

FIG. 1 is a perspective view illustrating a configuration of an image measuring apparatus 1 as an example of a measuring apparatus. The image measuring apparatus 1 includes a measuring apparatus main body 10 and a computer 20 performing drive control of the measuring apparatus main body 10 and executing necessary data processing.

The measuring apparatus main body 10 includes a table 11, a sample stage 12, support arms 13a and 13b, an X-axis guide 14, and an image capture apparatus 15. As shown in FIG. 1, the measuring apparatus main body 10 is arranged on an anti-vibration table 3 installed on a floor. The table 11 is arranged on a top plate of the anti-vibration table 3 and the stage 12, on which a measured object (work piece) W is placed, is placed on the table 11 such that a top surface of the stage 12 (as a base surface) aligns with a horizontal plane. The stage 12 is driven by a Y-axis drive mechanism (not shown in the drawings) in a Y axis direction and allows movement of the work piece W in the Y axis direction with respect to the image capture apparatus 15. The support arms 13a and 13b extending upward are fixated to a center of both side edges of the table 11, and the X-axis guide 14 is fixated so as to couple top ends of both of the support arms 13a and 13b. The image capture apparatus 15 is supported by the X-axis guide 14. The image capture apparatus 15 is driven along the X-axis guide 14 by an X-axis drive mechanism (not shown in the drawings).

The image capture apparatus 15 includes an image optical head 151 capturing a two-dimensional image of the work piece W and measures the work piece at a measurement position set by the computer 20.

Figure 2:
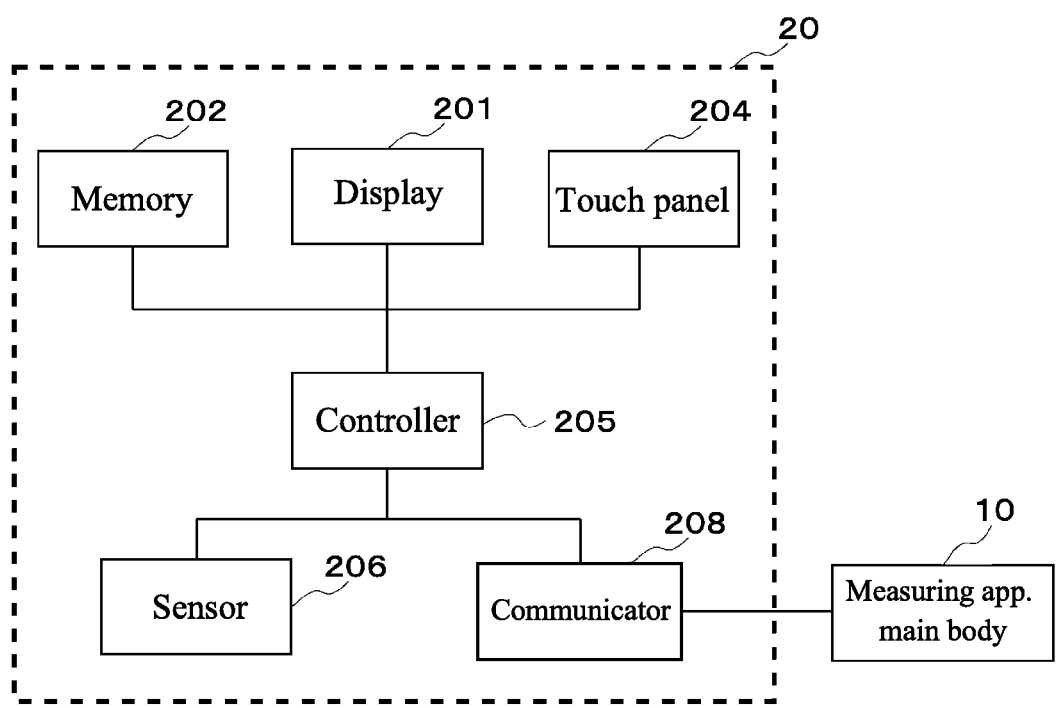
FIG. 2 is a functional block diagram of a computer.

The computer 20 according to the present embodiment is a tablet computer provided with a so-called touch screen panel display having the touch screen panel superimposed on the display. The computer 20 controls the measuring apparatus main body 10 and executes measurement. The computer 20 also obtains measurement results from the measuring apparatus main body and processes the measurement data. FIG. 2 is a functional block diagram illustrating a configuration of the computer main body 20. The computer 20 includes a display 201, a memory 202, a touch screen panel 204, a controller 205, a sensor 106, and a communicator 208.

The display 201 is, for example, an LCD (Liquid Crystal Display) or OELD (Organic Electro-Luminescent Display). The display 201 performs various displays according to the control of the controller 205. The display 201 displays, for example, an operation screen of a measuring program for controlling the measuring apparatus main body 10 and processing the measurement results. A screen displayed by the display 201 can be partially enlarged and displayed using an enlarged display process described below.

The memory 202 is a rewritable memory device such as RAM (Random Access Memory), HDD (Hard disk drive), and SSD (Solid State Drive). The memory 202 stores various kinds of programs executed by the controller 205 (such as the measuring program for controlling the measuring apparatus main body 10 and processing the measurement results, and an enlarged display control program executing the enlarged display process), data used by the program, and the like.

The touch screen panel 204 is a device that detects an input operation by a contact. The touch screen panel 204 transmits the detected input operation to the controller 205. The touch screen panel 204 is superimposed on the display 201 and serves as a so-called touch input interface in coordination with the display 201. Further, the computer 20 may provide input mechanisms other than the touch screen panel 204, such as a physical button and a microphone.

The controller 205 is a processor such as a CPU (Central Processing Unit) and controls each portion of the image measuring apparatus 1 by retrieving and executing the program stored in the memory 202. For example, the computer 205, by executing measuring program, controls the measuring apparatus main body 10 and executes measurement, and also obtains measurement results from the measuring apparatus main body and processes the measurement data.

The sensor 206 includes a sensor that detects a posture (inclination) and oscillation of the computer 20. The sensor provided by the sensor 206 may be, for example, an accelerometer detecting acceleration, an oscillation sensor detecting oscillation, a gyro sensor detecting angular speed, and the like.

The communicator 208 controls data communications between the measuring apparatus main body and a communication enabled device. A communication method of the communicator 208 may use both wireless communication and wired communication.

Operation Screen of Measuring Program

Next, a description is given of an operation screen of a measuring program which is executed by the controller 205 and displayed in the display 201.

Figure 3:
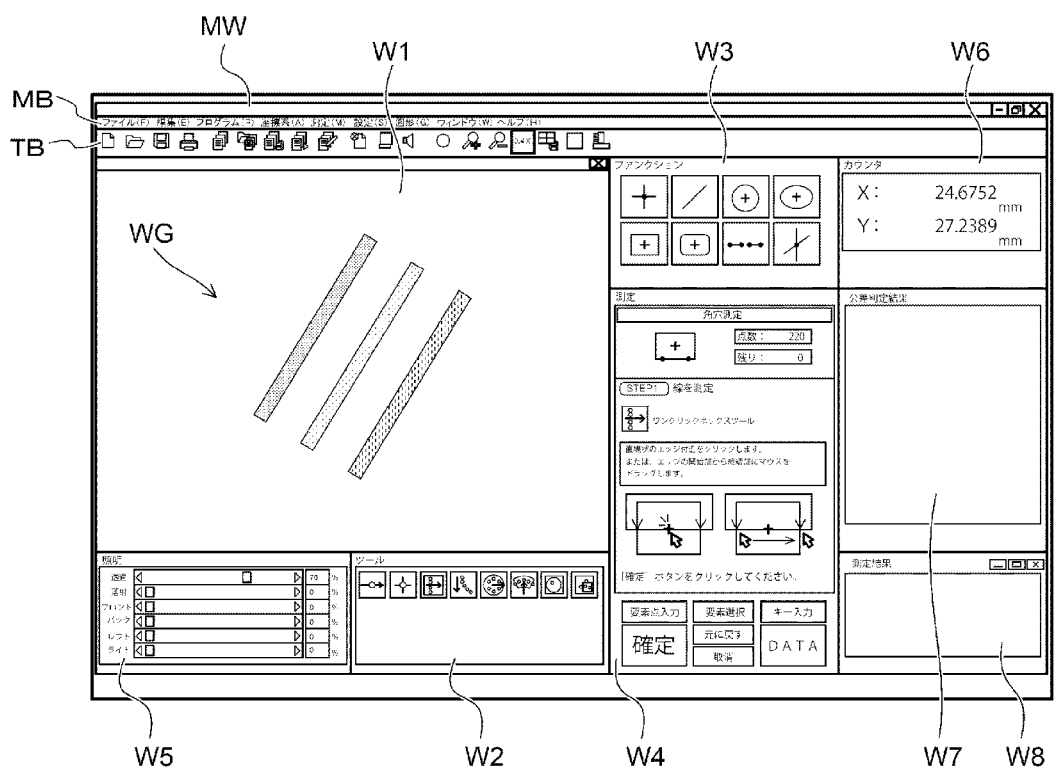
FIG. 3 illustrates an exemplary display screen displayed on a touch screen panel display.

FIG. 3 illustrates the exemplary operation screen of the measuring program which is displayed in the display 201. As shown in FIG. 3, a plurality of windows (first window W1 through eighth window W8) are displayed inside a main window MW. The present embodiment describes an example where eight windows are displayed; however, displays of other than eight windows are also possible, according to the requirements of an embodiment. In addition, a layout of the various windows can be freely changed through an operation by the user.

An image WG of the work piece W captured by the image measuring apparatus 1 is displayed in the first window W1. Icons of tools that the user can select are displayed in the second window W2. The tool icons provided correspond to methods for specifying a measurement point on the image WG of the work piece W. Icons of functions that the user can select are displayed in the third window W3. A fourth window W4 displays guidance indicating an operation sequence related to the measurement, and also displays a pattern G corresponding to an operation step. A fifth window W5 displays various sliders for controlling illumination striking the work piece W. By operating the sliders, the user can provide the desired illumination to the work piece W. A sixth window W6 displays XY coordinate values of the stage 12. The XY coordinate values displayed in the sixth window W6 are X axis direction coordinates and Y axis direction coordinates of the stage 12 relative to a predetermined origin point. A seventh window W7 displays tolerance determination results. In other words, in a case where a measurement method capable of performing a tolerance determination is selected, the seventh window W7 displays those results. An eighth window W8 displays measurement results. In other words, in a case where a measurement method obtaining measurement results using a predetermined calculation is selected, the eighth window W8 displays those results. Detailed depictions of the tolerance determination results displayed in the seventh window W7 and the measurement results displayed in the eighth window W8 are omitted from the drawings.

In addition, as shown in FIG. 3, a menu bar MB arranged with menu items written in letters and a tool bar TB arranged with icons for a variety of operations and settings are also displayed on an upper portion inside the main window MW. The menu bar MB and the tool bar TB are displayed on the upper portion of the main window MW, for example. However, a relative display position (such as bottom, right, left, and the like) inside the main window MW may be selectable through the settings. Generally, the menus displayed in the menu bar MB and the icons displayed in the tool bar TB are displayed in a size appropriate for operation by a conventional input mechanism such as a mouse. Therefore, erroneous operations occur easily when operated by the touch interface.

Enlarged Display Process

Figure 4:
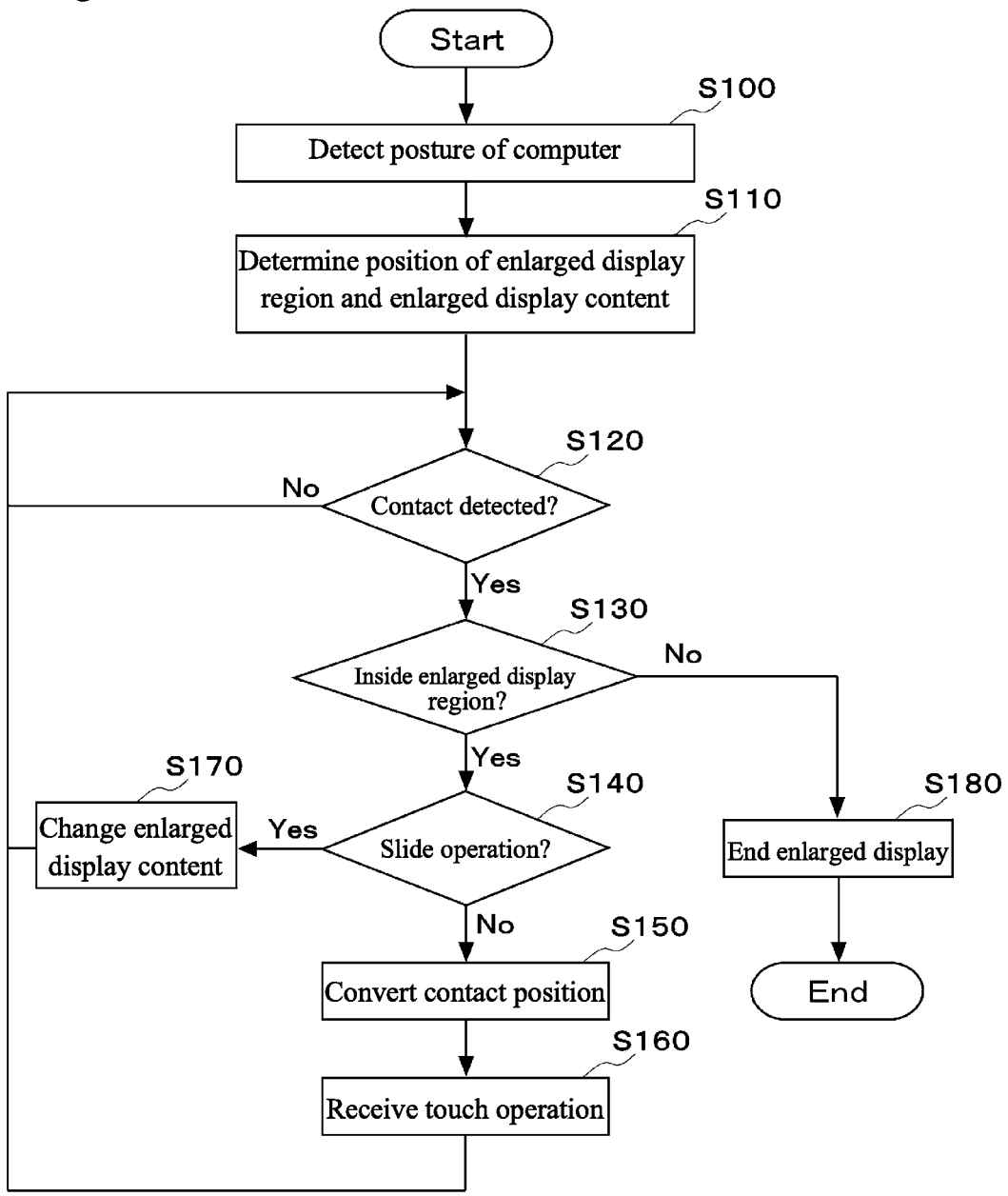
FIG. 4 is a flow chart illustrating an enlarged display process.
Figure 5A:
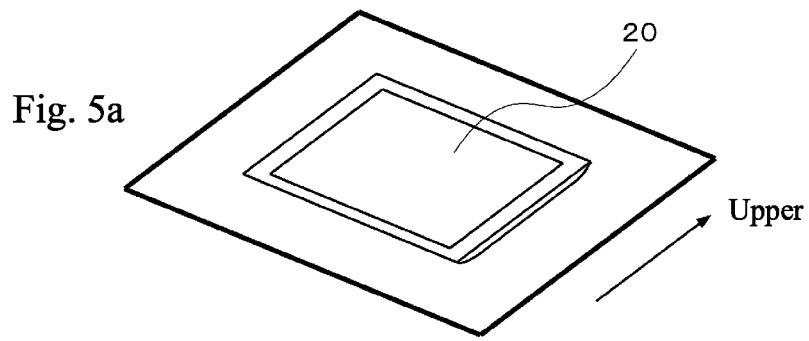
FIGS. 5a to 5d illustrate exemplary postures of the computer.
Figure 6A:
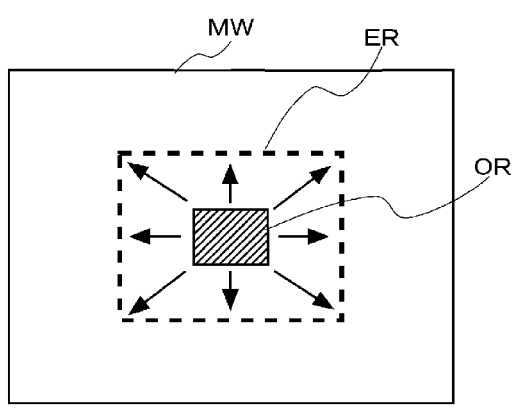
FIGS. 6a to 6d illustrate a relationship between enlarged display content and an enlarged display region.

Next, a description is given of the enlarged display process which partially enlarges and displays the screen displayed in the display 201. The enlarged display process is executed by the enlarged display program stored in the memory 202. FIG. 4 is a flow chart illustrating a procedure of the enlarged display process. The enlarged display process is started on the condition that a predetermined oscillation is detected by the sensor 206. In other words, the enlarged display process does not start unless oscillation in the vertical direction is detected by the sensor 206. In this example, the predetermined oscillation may be an oscillation with a strength exceeding a predetermined threshold value, for example. Further, the predetermined oscillation may be identified where the size of oscillation is at least the threshold value in any direction, without limiting the direction of oscillation, or may be identified where the oscillation is only in a predetermined direction (for example, up-down (vertical) direction, left-right direction, front-back direction). When the oscillation direction is limited, the direction may be determined in advance or be changed by the user through settings. In the present example, an example is described where the oscillation is detected in a state where the operation screen illustrated in FIG. 3 is displayed and the enlarged display process is started When the enlarged display process is started by the sensor 206 detecting the oscillation in the vertical direction, the controller 205 obtains from the sensor 206 the posture (or inclination) of the computer 20 at the time when the oscillation is detected (step S100). Next, according to the obtained posture, the controller 205 determines the position of a region ER (hereafter referred to as an enlarged display region) which is enlarged and displayed in the display 201 and enlarged display content displayed in the enlarged display region ER, and displays the enlarged display content in the enlarged display region ER of the display 201 (step S110). Further, the enlarged display content is a portion of the image displayed in the display 201. For example, as illustrated in FIG. 5a, where a horizontal posture having a normal line of the screen of the display 201 oriented in the vertical direction is used as a reference, when the horizontal posture is detected in step S100, a central region of the display 201 (for example, a predetermined region including a center of the screen) may be configured as the enlarged display region ER. At this point, the enlarged display content is content displayed inside a region OR having a similar shape to the enlarged display region ER and includes the center of the original operation screen as shown in FIG. 6a, and the content may be enlarged according to the size of the enlarged display region ER and be displayed while maintaining an aspect ratio. Further, magnification power of the display in the enlarged display region ER (specifically, a dimensional ratio between the enlarged display region ER and a region where the enlarged display content is displayed in the original operation screen) may be a predetermined magnification power, however, the magnification power is preferably determined according to the number of oscillations detected at the time when the enlarged display process started (for example, the greater the number is, the higher the magnification power).

Figure 5B:
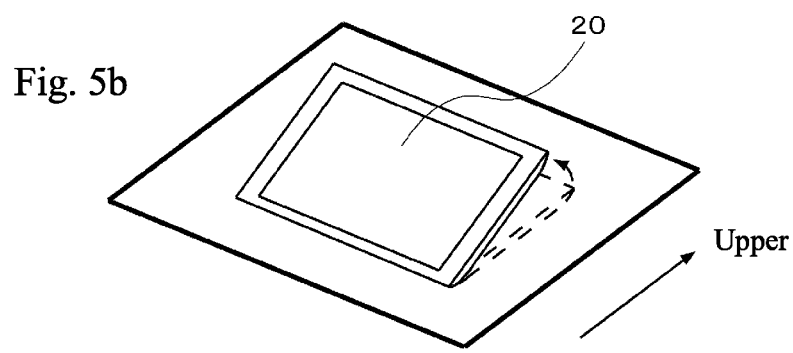
Figure 6B:
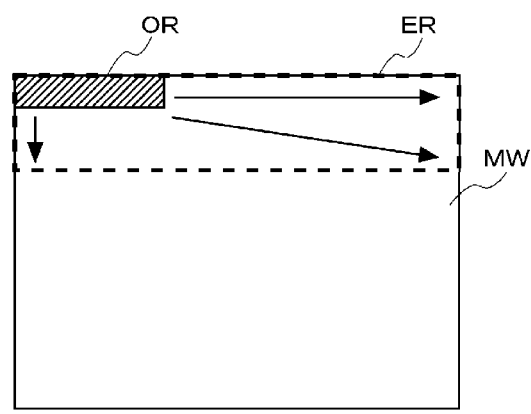

In addition, when a posture is detected where an upper portion of the computer 20 is lifted as shown in FIG. 5b, the region on the upper portion of the display 201 (for example, a region defined by a predetermined height in the vertical direction from an upper end of the screen and a total width of the screen in a lateral direction) may be configured to be the enlarged display region ER. At this point, the enlarged display content is content displayed inside the region OR having the similar shape to the enlarged display region ER and includes a left upper end of the original operation screen as shown in FIG. 6b, for example, and the content may be enlarged according to the size of the enlarged display region ER and be displayed while maintaining the aspect ratio.

Figure 5C:
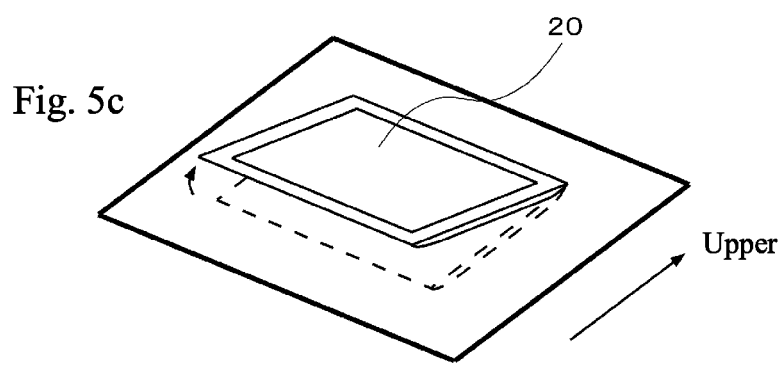
Figure 6C:
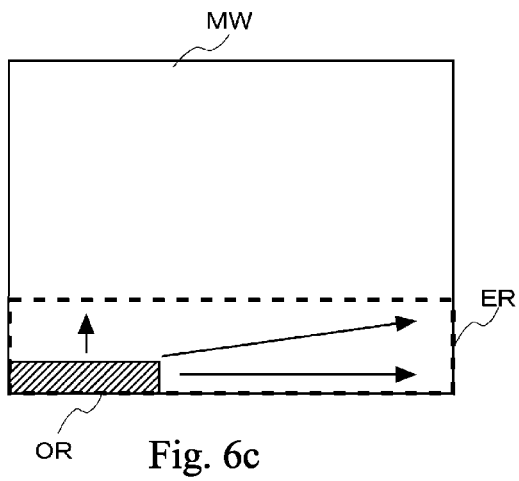

In addition, when a posture is detected where a bottom portion of the computer 20 is lifted as shown in FIG. 5c, a region on a bottom portion of the display 201 (for example, a region defined by a predetermined height in the vertical direction from a bottom end of the screen and the total width of the screen in the lateral direction) may be configured to be the enlarged display region ER. In this case, the enlarged display content is content displayed inside the region OR having the similar shape to the enlarged display region ER and includes a left bottom end of the original operation screen as shown in FIG. 6c, and the content may be enlarged according to the size of the enlarged display region ER and be displayed while maintaining the aspect ratio.

Figure 5D:
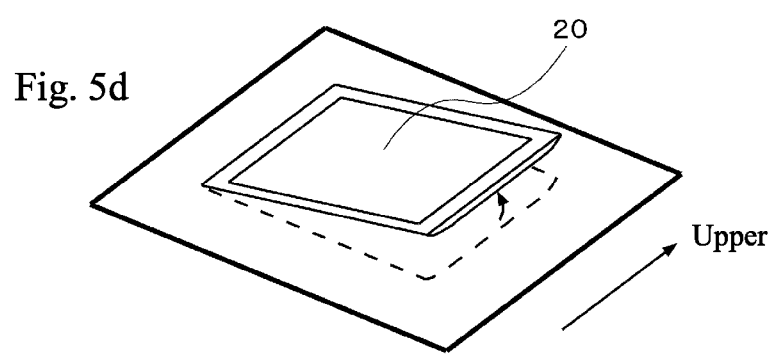
Figure 6D:
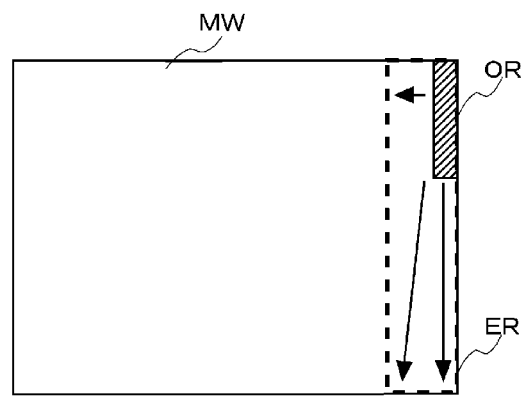

In addition, when a posture is detected where a right side of the computer 20 is lifted as shown in FIG. 5d, a right side region of the display 201 (for example, a region from the upper end to the bottom end of the screen in the vertical direction and to a position having a predetermined width from the right end in the lateral direction) may be configured to be the enlarged display region ER. In this case, the enlarged display content is content displayed inside the region OR having the similar shape to the enlarged display region ER and includes a right upper end of the original operation screen as shown in FIG. 6d, and the content may be enlarged according to the size of the enlarged display region ER and be displayed while maintaining the aspect ratio. Similarly, when a posture is detected where a left side of the computer 20 is lifted, the left side region of the display 201 is treated as the enlarged display region ER and the enlarged display content may also be determined the same way.

Moreover, the display position of the enlarged display region ER and the enlarged display content (in other words, the similarly shaped region OR) initially displayed in the enlarged display region ER are preferably configured so as to be settable by the user in advance in correspondence to the posture when the oscillation is detected. With such a configuration, a region having high usage frequency can be enlarged and displayed from the beginning, making it possible to save time and effort in changing the display content each time the enlarged display process is performed. Furthermore, in the example described above, both the position of the enlarged display region ER and the enlarged display content displayed in the enlarged display region ER differ according to the posture when the oscillation is detected, however, the present invention may also be configured such that only one of the position of the enlarged display region ER or the enlarged display content displayed in the enlarged display region ER differs. For example, the display position of the enlarged display region ER may be positioned at the upper portion of the screen (see FIG. 6b) regardless of the posture when the oscillation is detected, and the enlarged display content initially displayed in the enlarged display region ER may differ according to the posture when the oscillation is detected. In this way, when the user performs an operation while carrying the computer 20 in hand, the enlarged display region ER can be arranged at a position having excellent operability (such as the upper or lower portion of the screen) and erroneous operations can be prevented.

Next, the controller 205 determines whether the contact with respect to the touch screen panel 204 is detected (step S120). When the contact is not detected, (step S120: No), the process is repeated until a tap is detected. In other words, the computer 20 waits until contact with the touch screen panel 204 is detected.

When the contact with the touch screen panel 204 is detected (step S120: Yes), the controller 205 determines whether the position where the contact started is inside the enlarged display region (step S130).

When the contact start position is not inside the enlarged display region ER (step S130: No), the controller 205 ends (terminates or closes) the enlarged display, and the display in the display 201 is restored to the original operation screen (operation screen before the enlarged display process has started) (step S180) and the process ends.

On the other hand, when the contact start position is inside the enlarged display region ER (step S130: Yes), the controller 205 determines whether the operation performed by the contact is the slide operation (contact position is moved while maintaining the contact, then moved) (step S140).

Figure 7A:
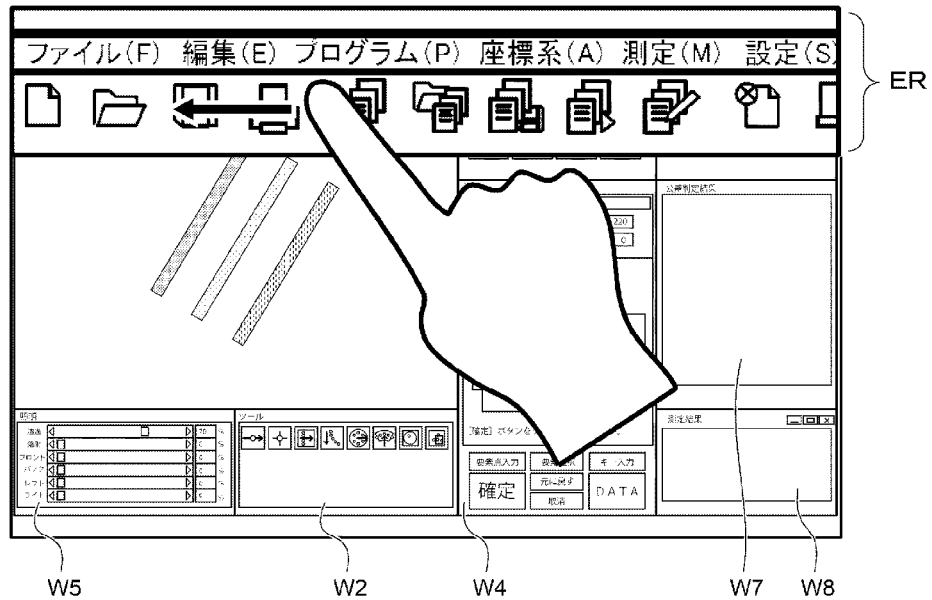
FIGS. 7a to 7b illustrate an exemplary display when a slide operation is performed with respect to the enlarged display region.
Figure 7B:
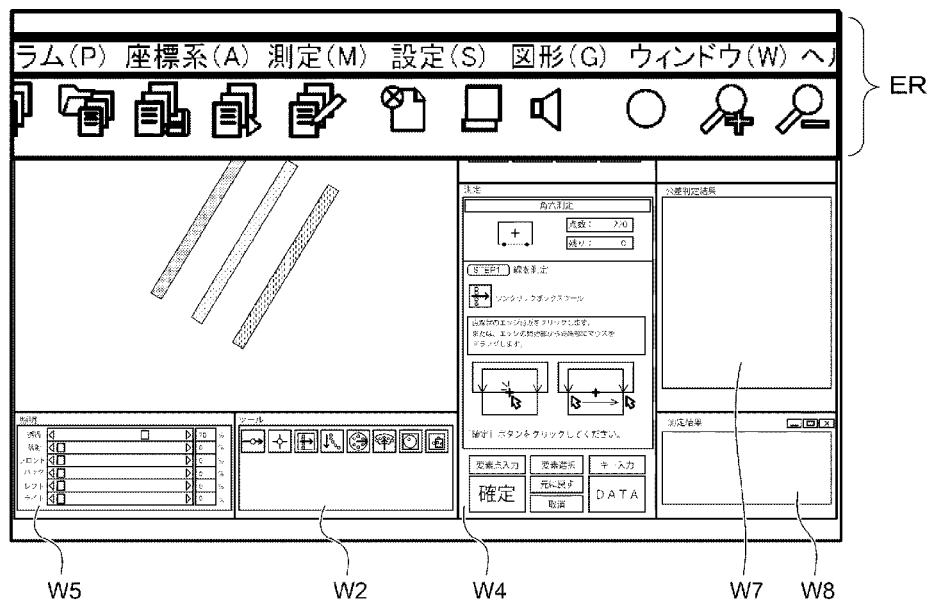

When the operation performed by the contact within the enlarged display region ER is the slide operation (step S140: Yes), the controller 205 changes the enlarged display content according to the direction and/or the size of the slide (step S170). For example, as shown in FIG. 7a, in a state where the menu bar MB and the tool bar TB (upper left portion in the operation screen) are enlarged and displayed in the enlarged display region ER positioned in the upper portion of the screen, when the slide operation in which the contact position inside the enlarged display region ER is moved in a left direction, the enlarged display content is changed following the slide operation and a region to the right of the initial position may become the enlarged display content. After ending step S170, the controller 205 returns the process to step S120 and waits until the next contact is detected. The user repeats the slide operation inside the enlarged display region and the portion the user wants to display enlarged inside the operation screen can be displayed inside the enlarged display region ER.

When the operation performed by the contact within the enlarged display region ER is not the slide operation (touch operation other than the slide operation, in other words) (step S140: No), the controller 205 converts the contact position in the enlarged display region ER to a position in the original operation screen (operation screen before starting the enlarged display process) based on the enlarged display content displayed in the enlarged display region ER when the touch operation is performed (step S150) and the controller 205 receives the operation such that the touch operation with respect to the converted position in the original operation screen is input (step S160). For example, when an icon of the tool bar is tapped while the icon is enlarged and displayed in the enlarged display region ER, the controller 205 receives the operation as the same input as when the icon is tapped in the original operation screen, and executes the process assigned to the icon for the measuring program. In the enlarged display process, the controller 205 returns the process to step S120 after ending step S160 and waits until the next contact is detected.

With the enlarged display process described above, an operation interface suitable for the touch input can be realized. Particularly, even when conventional PC software is used without modification, the portion to be input operated is displayed enlarged to allow tapping, and therefore, erroneous input can be prevented. For example, the menu bar MB or the tool bar TB displayed on the upper portion in the screen is likely to be displayed in a relatively small size. Therefore, unintentional input may be made when the touch input is performed in a normal display state. However, erroneous input can be prevented by applying the present invention.

Embodiments are described above. However, the present invention is not limited to these examples. For example, the embodiment above describes an example when the enlarged display process is applied to the measuring screen for the measuring program of the image measuring apparatus, however, the measuring apparatus is not limited to the image measuring apparatus and any measuring apparatus may be used. In addition, the present invention can be applied to the operation screen for various programs other than the measuring program of the measuring apparatus.

Further, in the embodiment described above, the posture is determined based on the horizontal posture having the normal line of the screen of the display 201 oriented vertically upward as a reference, however, any posture may be used as a reference. For example, the posture may be determined by inclination based on a posture where the computer 20 stands perfectly upright (the normal line of the screen of the display 201 is horizontal and a lateral direction of the screen is also horizontal).

Furthermore, in the embodiment described above, the configuration includes the computer 20 having the touch screen panel display configured with the display 201 and the touch screen panel 204, and the computer 20 also performs the control of the measuring apparatus. However, the functions to control the measuring apparatus may be provided as a control device separate from the computer having the touch screen panel display. In this case, the computer having the touch screen panel display may serve as an input/output device for the control device.

Moreover, in the embodiment described above, when the contact is detected in the region outside the enlarged display region ER, the enlarged display ends and returns to the original screen. However, the enlarged display may be ended when the contact is not detected for a fixed period of time, in place of/in addition to the contact in the region outside the enlarged display region ER.

Also, in the embodiment described above, when the slide operation inside the enlarged display region ER is detected, the enlarged display content changes following the slide operation. However, an operation object (such as an operation button) to move the enlarged display content may be displayed in the display 201 and the enlarged display content may be changed according to an operation of the operation object when the touch screen panel 204 detects the operation of the operation object. The operation object to move the enlarged display content may be displayed inside the enlarged display region.

With respect to the above-described embodiments, a person skilled in the art can make additions, deletions, and design modifications of configuration elements as appropriate, and can combine features of the embodiments as appropriate, and such modifications are also included in the scope of the present invention as long as they fall inside the subject matter of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, inside the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are inside the scope of the appended claims.

The present invention is not limited to the above described embodiments, and various variations and modifications may be possible without departing from the scope of the present invention.

What is claimed is:

1. A terminal device comprising:
a controller;
a display that displays an image based on a control by the controller; and
a sensor that detects oscillation of the terminal device,
wherein the controller displays, in response to a predetermined oscillation of the terminal device detected by the sensor, enlarged display content which is a portion of an image displayed in the display, the enlarged display content being enlarged and displayed in an enlarged display region,
wherein
i) when the sensor detects oscillation of the terminal device in the vertical direction and the posture of the terminal device at the time of such detection is horizontal, the enlarged display region is centered at the center of a screen of the display,
ii) when the sensor detects oscillation of the terminal device in the vertical direction and the posture of the terminal device at the time of such detection is that the upper portion of the terminal device is lifted, the enlarged display region is positioned to extend from the upper end of the screen downward therefrom by a predetermined height in the vertical direction and to extend the entire width of the screen of the display,
iii) when the sensor detects oscillation of the terminal device in the vertical direction and the posture of the terminal device at the time of such detection is that the bottom portion of the terminal device is lifted, the enlarged display region is positioned to extend from the lower end of the screen display upward therefrom by a predetermined height in the vertical direction and to extend the entire width of the screen of the display,
iv) when the sensor detects oscillation of the terminal device in the vertical direction and the posture of the terminal device at the time of such detection is that the right portion of the terminal device is lifted, the enlarged display region is positioned to extend from the right end of the screen display leftward therefrom by a predetermined width in the lateral direction and to extend the entire height of the screen of the display, and
v) when the sensor detects oscillation of the terminal device in the vertical direction and the posture of the terminal device at the time of such detection is that the left portion of the terminal device is lifted, the enlarged display region is positioned to extend from the left end of the screen display rightward therefrom by a predetermined width in the lateral direction and to extend the entire height of the screen of the display.

2. The terminal device according to claim 1, wherein:
the sensor is configured to detect oscillation and posture, and
the controller obtains from the sensor the posture at the time when the sensor detects the oscillation, and determines a position of the enlarged display region in the display according to the obtained posture.

3. The terminal device according to claim 2, wherein the controller determines magnification power to enlarge the enlarged display content according to a size and/or repetition of the oscillation detected by the sensor.

4. The terminal device according to claim 3, further comprising a touch screen panel superimposed on the display, the touch screen panel configured to detect an input operation due to a contact, wherein when the touch screen panel detects a slide operation being performed with respect to a position corresponding to the enlarged display region, the controller changes the enlarged display content according to one of a direction and size of the slide operation.

5. The terminal device according to claim 4, wherein when the touch screen panel further detects an input operation other than the slide operation, based on the enlarged display content displayed in the enlarged display region when the input operation is performed, the controller converts a contact position in the enlarged display region to a position in an original image and receives the input operation as a contact operation with respect to the converted original image position.

6. The terminal device according to claim 4, wherein the controller, in a state where the enlarged display region is displayed, terminates displaying the enlarged display region and displays the original image on the display, when the touch screen panel detects an input operation with respect to a region outside of the enlarged display region.

7. The terminal device according to claim 3, further comprising a touch screen panel superimposed on the display, the touch screen panel configured to detect an input operation due to a contact, wherein when the touch screen panel detects an input operation being performed with respect to a position corresponding to the enlarged display region, based on the enlarged display content displayed in the enlarged display region when the input operation is performed, the controller converts a contact position in the enlarged display region to a position in an original image and receives the input operation as a contact operation with respect to the converted original image position.

8. The terminal device according to claim 2, further comprising a touch screen panel superimposed on the display, the touch screen panel configured to detect an input operation due to a contact, wherein when the touch screen panel detects a slide operation being performed with respect to a position corresponding to the enlarged display region, the controller changes the enlarged display content according to one of a direction and size of the slide operation.

9. The terminal device according to claim 8, wherein when the touch screen panel further detects an input operation other than the slide operation, based on the enlarged display content displayed in the enlarged display region when the input operation is performed, the controller converts a contact position in the enlarged display region to a position in an original image and receives the input operation as a contact operation with respect to the converted original image position.

10. The terminal device according to claim 8, wherein the controller, in a state where the enlarged display region is displayed, terminates displaying the enlarged display region and displays the original image on the display, when the touch screen panel detects an input operation with respect to a region outside of the enlarged display region.

11. The terminal device according to claim 2, further comprising a touch screen panel superimposed on the display, the touch screen panel configured to detect an input operation due to a contact, wherein when the touch screen panel detects an input operation being performed with respect to a position corresponding to the enlarged display region, based on the enlarged display content displayed in the enlarged display region when the input operation is performed, the controller converts a contact position in the enlarged display region to a position in an original image and receives the input operation as a contact operation with respect to the converted original image position.

12. The terminal device according to claim 1, wherein the controller determines magnification power to enlarge the enlarged display content according to a size and/or repetition of the oscillation detected by the sensor.

13. The terminal device according to claim 2, further comprising a touch screen panel superimposed on the display, the touch screen panel configured to detect an input operation due to a contact, wherein when the touch screen panel detects a slide operation being performed with respect to a position corresponding to the enlarged display region, the controller changes the enlarged display content according to one of a direction and size of the slide operation.

14. The terminal device according to claim 13, wherein when the touch screen panel further detects an input operation other than the slide operation, based on the enlarged display content displayed in the enlarged display region when the input operation is performed, the controller converts a contact position in the enlarged display region to a position in an original image and receives the input operation as a contact operation with respect to the converted original image position.

15. The terminal device according to claim 13, wherein the controller, in a state where the enlarged display region is displayed, terminates displaying the enlarged display region and displays the original image on the display, when the touch screen panel detects an input operation with respect to a region outside of the enlarged display region.

16. The terminal device according to claim 2, further comprising a touch screen panel superimposed on the display, the touch screen panel configured to detect an input operation due to a contact, wherein when the touch screen panel detects an input operation being performed with respect to a position corresponding to the enlarged display region, based on the enlarged display content displayed in the enlarged display region when the input operation is performed, the controller converts a contact position in the enlarged display region to a position in an original image and receives the input operation as a contact operation with respect to the converted original image position.

17. The terminal device according to claim 1, further comprising a touch screen panel superimposed on the display, the touch screen panel configured to detect an input operation due to a contact, wherein when the touch screen panel detects a slide operation being performed with respect to a position corresponding to the enlarged display region, the controller changes the enlarged display content according to one of a direction and size of the slide operation.

18. The terminal device according to claim 17, wherein when the touch screen panel further detects an input operation other than the slide operation, based on the enlarged display content displayed in the enlarged display region when the input operation is performed, the controller converts a contact position in the enlarged display region to a position in an original image and receives the input operation as a contact operation with respect to the converted original image position.

19. The terminal device according to claim 17, wherein the controller, in a state where the enlarged display region is displayed, terminates displaying the enlarged display region and displays the original image on the display, when the touch screen panel detects an input operation with respect to a region outside of the enlarged display region.

20. The terminal device according to claim 1, further comprising a touch screen panel superimposed on the display, the touch screen panel configured to detect an input operation due to a contact, wherein when the touch screen panel detects an input operation being performed with respect to a position corresponding to the enlarged display region, based on the enlarged display content displayed in the enlarged display region when the input operation is performed, the controller converts a contact position in the enlarged display region to a position in an original image and receives the input operation as a contact operation with respect to the converted original image position.

21. The terminal device according to claim 1, wherein a magnification power of the enlarged display content is determined in accordance with the number of oscillations sensed by the sensor.

22. The terminal device according to claim 1, wherein when screen contact with a user is detected outside the enlarged display region, the display of the enlarged display content ends.

23. At least one tangible, non-transitory computer-readable medium storing an executable set of instructions for controlling a computer to function as a terminal device, wherein the set of instructions, when executed by a computer processor, causes the computer processor to execute operations comprising:

detecting an oscillation of the terminal device with a sensor; and displaying, on a display, an image based on a control by a controller in response to a detected predetermined oscillation of the terminal device detected by the detecting with the sensor, wherein the image includes enlarged display content which is enlarged and displayed in an enlarged display region of the display, wherein
i) when the sensor detects oscillation of the terminal device in the vertical direction and the posture of the terminal device at the time of such detection is horizontal, the enlarged display region is centered at the center of a screen of the display,
ii) when the sensor detects oscillation of the terminal device in the vertical direction and the posture of the terminal device at the time of such detection is that the upper portion of the terminal device is lifted, the enlarged display region is positioned to extend from the upper end of the screen downward therefrom by a predetermined height in the vertical direction and to extend the entire width of the screen of the display,
iii) when the sensor detects oscillation of the terminal device in the vertical direction and the posture of the terminal device at the time of such detection is that the bottom portion of the terminal device is lifted, the enlarged display region is positioned to extend from the lower end of the screen display upward therefrom by a predetermined height in the vertical direction and to extend the entire width of the screen of the display,
iv) when the sensor detects oscillation of the terminal device in the vertical direction and the posture of the terminal device at the time of such detection is that the right portion of the terminal device is lifted, the enlarged display region is positioned to extend from the right end of the screen display leftward therefrom by a predetermined width in the lateral direction and to extend the entire height of the screen of the display, and
v) when the sensor detects oscillation of the terminal device in the vertical direction and the posture of the terminal device at the time of such detection is that the left portion of the terminal device is lifted, the enlarged display region is positioned to extend from the left end of the screen display rightward therefrom by a predetermined width in the lateral direction and to extend the entire height of the screen of the display.

* * * * *